US008109757B1

(12) United States Patent
Fusi, III

(10) Patent No.: US 8,109,757 B1
(45) Date of Patent: Feb. 7, 2012

(54) METHOD AND SYSTEM FOR MOLDING ELASTOMERIC FIGURES

(76) Inventor: John Constantine Fusi, III, Madison, NJ (US)

( * ) Notice: Subject to any disclaimer, the term of this patent is extended or adjusted under 35 U.S.C. 154(b) by 347 days.

(21) Appl. No.: 12/534,257

(22) Filed: Aug. 3, 2009

Related U.S. Application Data

(60) Provisional application No. 61/085,892, filed on Aug. 4, 2008.

(51) Int. Cl.
*B29C 45/00* (2006.01)
*B29C 45/02* (2006.01)
*B29C 45/16* (2006.01)

(52) U.S. Cl. ............... 425/572; 425/DIG. 57; 425/449; 425/595; 425/192 R; 264/328.6

(58) Field of Classification Search ............. 264/328.6, 264/328.1; 425/190, 192 R, DIG. 57, 572, 425/589, 595
See application file for complete search history.

(56) References Cited

U.S. PATENT DOCUMENTS

| | | | | |
|---|---|---|---|---|
| 2,438,856 A * | 3/1948 | Knowles | ...................... | 425/190 |
| 2,578,105 A * | 12/1951 | Taylor | ........................... | 425/568 |
| 3,819,313 A * | 6/1974 | Josephsen et al. | ............. | 425/560 |
| 3,907,245 A * | 9/1975 | Linder | ............................... | 249/94 |
| 3,920,368 A * | 11/1975 | Lemelson | ...................... | 425/195 |
| 3,986,804 A * | 10/1976 | Albright | ........................ | 425/190 |
| 4,076,476 A * | 2/1978 | Ventura | ........................ | 425/183 |
| 4,135,180 A * | 1/1979 | White | ............................ | 366/336 |
| 4,215,843 A * | 8/1980 | Gay et al. | ......................... | 249/78 |
| 6,322,344 B1 * | 11/2001 | Maruyama et al. | ............ | 425/130 |
| 6,555,037 B1 * | 4/2003 | Payne | ........................... | 264/40.7 |
| 7,179,409 B2 * | 2/2007 | Nishino | ......................... | 264/40.5 |
| 7,186,106 B2 * | 3/2007 | Kato et al. | ..................... | 425/169 |
| 7,275,924 B1 * | 10/2007 | Kreuzer | ........................ | 425/169 |
| 2004/0224042 A1 * | 11/2004 | Tzivanis et al. | ................ | 425/116 |
| 2007/0077328 A1 * | 4/2007 | Olaru et al. | ..................... | 425/572 |
| 2008/0038401 A1 * | 2/2008 | Manda | ........................... | 425/549 |

* cited by examiner

*Primary Examiner* — Joseph S. Del Sole
*Assistant Examiner* — Nahida Sultana
(74) *Attorney, Agent, or Firm* — Frank Marino

(57) ABSTRACT

A system for molding elastomeric figures includes a dispenser having first and second reservoirs containing co-reactive fluids. A mold is affixed to the dispenser and has a cavity in fluid communication with the reservoirs. A mixer is disposed between the reservoirs and cavity. A plunger forces the fluids from the reservoirs and through the mixer, where the fluids are homogeneously combined, and into the cavity. The combined fluids congeal within the cavity to form an elastomeric figure.

20 Claims, 6 Drawing Sheets

METHOD AND SYSTEM FOR MOLDING ELASTOMERIC FIGURES

RELATED APPLICATION

This application is a Continuation-in-Part of and claims the benefit of U.S. Provisional Application Ser. No. 61/085,892 filed Aug. 4, 2008, the entire teachings of which are incorporated herein by reference.

FIELD OF THE INVENTION

The present invention is related to methods and systems for home-molding toys, and toys molded thereby. More specifically, the present invention is realized in a method and system for home-molding full-bodied toy figures which may be accomplished by a child, and in the toys produced using such a method and system.

BACKGROUND

Home-molded toys and systems and methods for the production thereof are well known. A system first marketed by Mattel Inc in the nineteen-sixties under the brand Thingmaker® produces small one-sided rubber-like figures called Creepy Crawlers®, which is shown and described at http://en.wikipedia.org/wiki/Creepy_Crawlers. Similar systems are taught in U.S. Pat. No. 4,215,843 and U.S. Pat. No. 4,299,548.

One disadvantage of such prior art is the need for heat to cure the molded figures and the numerous obvious problems associated therewith. Another disadvantage is that the uncured materials are easily accessible to the child and that the figures are accessible to the child prior to full curing. Another disadvantage is that the figures remain too hot for handling for an extended period of time, even after curing. Another disadvantage is that the figures, cast in a one-sided mold, are not truly full-bodied, but instead are more "half-bodied" in that they have a contoured front side and a flat rear side, otherwise referred to as "bas-relief", and are therefore not realistic. Another disadvantage is that the figures, pour-cast under ambient pressure, are prone to include air bubbles and are incapable of forming very fine details. Another disadvantage is that the system provides no means for insert-molding accessories and limbs into the figures. Another disadvantage is that the system provides no means for producing multi-colored figures. Another disadvantage is that the system allows no flexibility in material choices to produce figures having differing physical properties. Another disadvantage of the Mattel prior art system is that the material used was highly plasticized polyvinyl chloride, which poses toxicological and environmental threats.

There exists a need for improvement in the methods for home-molding toy figures to overcome the various deficiencies of the prior art, including those listed above, and such is an object of the present invention.

Further needs and objects exist, which are addressed by the present invention, as may become apparent by the included disclosure of one or more exemplary embodiments thereof.

SUMMARY OF THE INVENTION

The present invention may be embodied in a method and system for producing home-molded figures, and the figures molded by such a method and/or system. As evidenced by the one or more embodiments shown herein, the invention may include methodical, mechanical and chemical aspects, and is preferably useable by a child.

In certain regards, the method and system emulates aspects of a true injection molding process and can thus be used to home-mold full-bodied figures, as compared to prior art bas-relief pour-casting systems. The figures of the herein described embodiments are removable from the mold and fully usable within as little as three minutes. The system uses and requires no dangerous or energy-consuming heat source and the method is conducted at normal room temperature, resulting in toy figures that need no cooling. The system molds the toys under a positive pressure to improve quality and detail over the prior art.

Preferably, the embodiment may employ platinum catalyzed RTV silicone chemistry which may be absent retarders and/or to which may be added accelerators. The material may preferably be a two part compound with a simple one-to-one volume mixing ratio, though this can be otherwise, through at least ten-to-one.

Durometers of the cured material may range from approximately ninety on the Shore "A" scale, down to approximately thirty on the Shore "00" scale. Certain lower durometer full-bodied figures are found to stick to vertical surfaces like walls, window panes, or furniture when thrown there-against, resulting in a slow sticking fall there-along, here-in referred to as "wall-walking". The creation of such figures by home-molding is an aspect of the invention.

The embodied system may employ a double-barreled syringe with a ganged dual plunger, each barrel including a different one of a Part A and Part B material. As the dual plunger is forced into the barrels, preferably-equal volumes of the materials are forced through a static mixing sprue to be formed into a homogenous mixture, and then into one or more cavities of a mold.

The mold is preferably two-sided and having a cavity for producing full-bodied figures, but may less-preferably be one-sided and have an open-faced cavity, and the mixture may simply be poured into the open-faced cavity and allowed to cure at standard temperature and pressure into a rubberlike bas-relief figure having a contoured front side and a flat backside.

In the preferred embodiment shown herein however, the mold is two sided and more akin to an injection mold, with no need for cooling lines or knockout pins. Full-bodied figures can thus be molded with the pressure of the plunger forcing the mixed material into finer details and compressing air bubbles, to provide a much higher quality figure than can be realized through a non-pressurized has relief system.

The system is adaptable to insert molding, to the bonding of one molded part to another, and to the fully encapsulated molding of one part within another.

Some applications of the invention may include:
  molding of simple individual figures emulating people, animals, insects, and such, in full full-bodied configurations;
  insert molding of parts over conventional injection molded subassemblies, such as car bodies insert molded over chassis subassemblies, with or without motors;
  insert molding of hard plastic appendages (heads, arms, legs, weapons, etc) into a softer body;
  insert molding of fabric or monofilament "hair" into figurines;
  low durometer wall-walking figures that stick to as they fall along vertical surfaces;
  low durometer fishing lures;

insert molding of ultra low durometer material to join higher durometer body, limbs, and head, to yield an articulated figure;

insert molding of either molded or otherwise formed letters into a wristband, to allow a child to create his or her own personalized message wristbands, but where the recessed lettering may be of a contrasting color;

ultra low durometer molding of clear shapes, to mix and match colors and shapes to create window art; and potting of parts and/or figures wholly into transparent material.

The molding system may preferably include one or more of the following features;

the double syringe containing the pre-mixed materials may be a replaceable element of the system, with the ganged piston plunger being an integral and permanent part of the system;

a nozzle or sprue including a static mixing sprue may be removable and replaceable, or the nozzle shape may be tapered to allow for easy pull out and replacement of the static mixing sprue elements;

the system may accept a variety of different easily removable and replaceable molds;

the unlocking and removal of the molds after molding may be intentionally made just complicated or burdensome enough to require enough time to ensure that the molded mixture has cured, denying children access to the uncured mixture;

the replaceable double syringe may be arranged to prevent the release of its materials other than thru its normal use in the system; and a third channel incorporated into the system may be employed to allow introduction of colorants, either through a third piston-driven syringe channel, or through a gravity drip nebulizer feed, between the syringe and the static mixing sprue.

In one exemplary embodiment, the invention may be practiced in a system for home-molding including a structure having a dispenser receiver, a movable plunger, and a plunger actuator. The system further includes a dispenser adapted for temporary affixation to the structure at the dispenser receiver and having a mold receiver, a reservoir containing a fluid adapted to remain in a liquid state while therein, a dispenser-structure interface for temporary affixation to the dispenser receiver, and a nozzle for allowing the fluid to exit the reservoir. The system further includes a mold having a mold-dispenser interface adapted for temporary affixation to the dispenser at the mold receiver, one of a gate and a sprue adapted for fluid communication with the nozzle when the mold is affixed to the dispenser at the mold-dispenser interface, first and second abuttable mold plates, and a cavity formed between the mold plates and in fluid communication with the gate.

The plunger actuator is adapted to cause the plunger to move relative to the base and impinge on the dispenser only when the dispenser is affixed to the structure at the dispenser-structure interface, and force the fluid there-from through the nozzle and, only when the mold is affixed to the dispenser at the mold-dispenser interface, though the gate and into the cavity. The system further includes means for causing the fluid to congeal in the mold cavity.

The system may further include an interlock for preventing the fluid from exiting the nozzle except when the one of a gate and a sprue is in fluid communication with the nozzle. The dispenser may have first and second reservoirs, and the fluid may be a first fluid contained within the first reservoir and a second fluid contained in the second reservoir, and the means for causing the fluid to congeal may be mixing the first and second fluids.

The system may further include a mixer fluidly disposed between the reservoirs and the cavity for mixing the first and second fluids prior to the fluids being forced into the cavity. The mixer may be removably disposed within the one of a gate and a sprue.

The cavity may have first and second cavity portions, the first cavity portion disposed in the first mold plate and the second cavity portion disposed in the second mold plate, and the first and second cavity portions may be united when the first and second mold plates are abutted to form the cavity. The mold may be disposed externally of the structure when affixed to the dispenser at the mold-dispenser interface.

The interlock may include a valve included in the nozzle and movable between a first position wherein the valve denies the exit of the fluid from the nozzle and a second position wherein the valve allows the exit of fluid from the nozzle, and a valve actuator included in the mold-dispenser interface and adapted to move the valve between the first and second positions. The valve may have a key and the structure may have a key receiver, and the key may be received by the key receiver only when the dispenser is affixed to the dispenser receiver and the valve is in the second position, and movement of the valve from the second position to the first position may remove the key from the key receiver. Receipt of the key by the key receiver may deny removal of the dispenser from the dispenser receiver.

The mold receiver may be adapted to retain the first and second mold plates abutted when the mold is affixed to the dispenser at the mold-dispenser interface.

The system may include one or more removable mold pins at least partially disposed within the cavity, the one or more pins adapted to cause orifices in the congealed fluid within the cavity when the one or more pins are removed there-from.

The invention may also be embodied in a system for home-molding elastomeric toy figures including a base having a dispenser receiving chamber, a movable plunger, and a plunger lever. The system also includes a dispenser adapted for insertion into the dispenser receiving chamber and having a mold receiving orifice, a first reservoir containing a first fluid, a second reservoir containing a second fluid, and a nozzle including one or more outlets for allowing the fluids to exit the reservoirs. The system also includes a mold having a fitting adapted for temporary affixation to the dispenser at the mold receiving orifice, one of a gate and a sprue adapted for fluid communication with the nozzle when the mold is affixed to the dispenser at the fitting; first and second abuttable mold plates, and a cavity formed between the mold plates and in fluid communication with the one of a gate and a sprue. The system further includes a mixer disposed within and in communication with the one of a gate and a sprue for mixing the first and second fluids having exited the reservoirs.

The plunger lever is adapted to cause the plunger to move relative to the base and impinge on the first and second reservoirs, only when the dispenser is inserted into the dispenser receiving chamber, and force the fluids there-from through the nozzle and, only when the mold is affixed to the dispenser at the fitting, though the one of a gate and a sprue, through the mixer, and into the cavity. The first and second fluids are co-reactive and thereby adapted to homogeneously congeal after mixing and within the cavity to form an elastomeric toy figure having a shape substantially identical to the cavity.

The system may also include an interlock for preventing the fluid from exiting the nozzle except when the one of a gate and a sprue is in fluid communication with the nozzle. The interlock may included a valve included in the nozzle and movable between a first position wherein the valve denies the exit of the fluid from the nozzle and a second position wherein the valve allows the exit of fluid from the nozzle. The interlock may also include a valve actuator included in the fitting and adapted to move the valve between the first and second positions.

The valve may have a pawl and the base may have a pawl receiver. The pawl may be received by the pawl receiver only when the valve is in the second position, and movement of the valve from the second position to the first position may remove the pawl from the pawl receiver. Receipt of the pawl by the pawl receiver may deny removal of the dispenser from the base.

The cavity may have first and second cavity portions, the first cavity portion disposed in the first mold plate and the second cavity portion disposed in the second mold plate. The first and second cavity portions may be united when the first and second mold plates are abutted to form the cavity.

The mold may be disposed externally of the base when affixed to the dispenser at the fitting. The mold receiving orifice may be adapted to retain the first and second mold plates abutted when the mold is affixed to the dispenser at the fitting.

The system may include one or more removable mold pins at least partially disposable within the cavity to cause orifices in the homogeneously congealed fluid within the cavity when the one or more pins are removed there-from.

The invention may also be practiced in a method for home-molding elastomeric toy figures in the above-summarized system, the method including;
  inserting the dispenser into the dispenser receiving chamber;
  disposing the mixer within the one of a gate and a sprue;
  abutting the first and second mold plates;
  affixing the fitting to the mold receiving orifice;
  causing the lever to move the plunger to impinge on the reservoirs and force the fluids there-from through the nozzle, the one of a gate and a sprue, and the mixer, and into the cavity;
  removing the fitting from the mold receiving orifice;
  separating the first and second plates; and
  removing the elastomeric toy figure from the cavity.

The method may further include;
  disposing the one or more mold pins within the cavity prior to the causing the lever;
  removing the one or more mold pins from the elastomeric toy figure to cause the orifices therein;
  providing appendages; and
  inserting the appendages into the orifices after the removing the elastomeric toy figure.

Further features and aspects of the invention are disclosed with more specificity in the Detailed Description and Drawings of an exemplary embodiment provided herein.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 6 is a top view of the system of FIG. 1 having the mold removed there-from;

DETAILED DESCRIPTION

Figure 1:
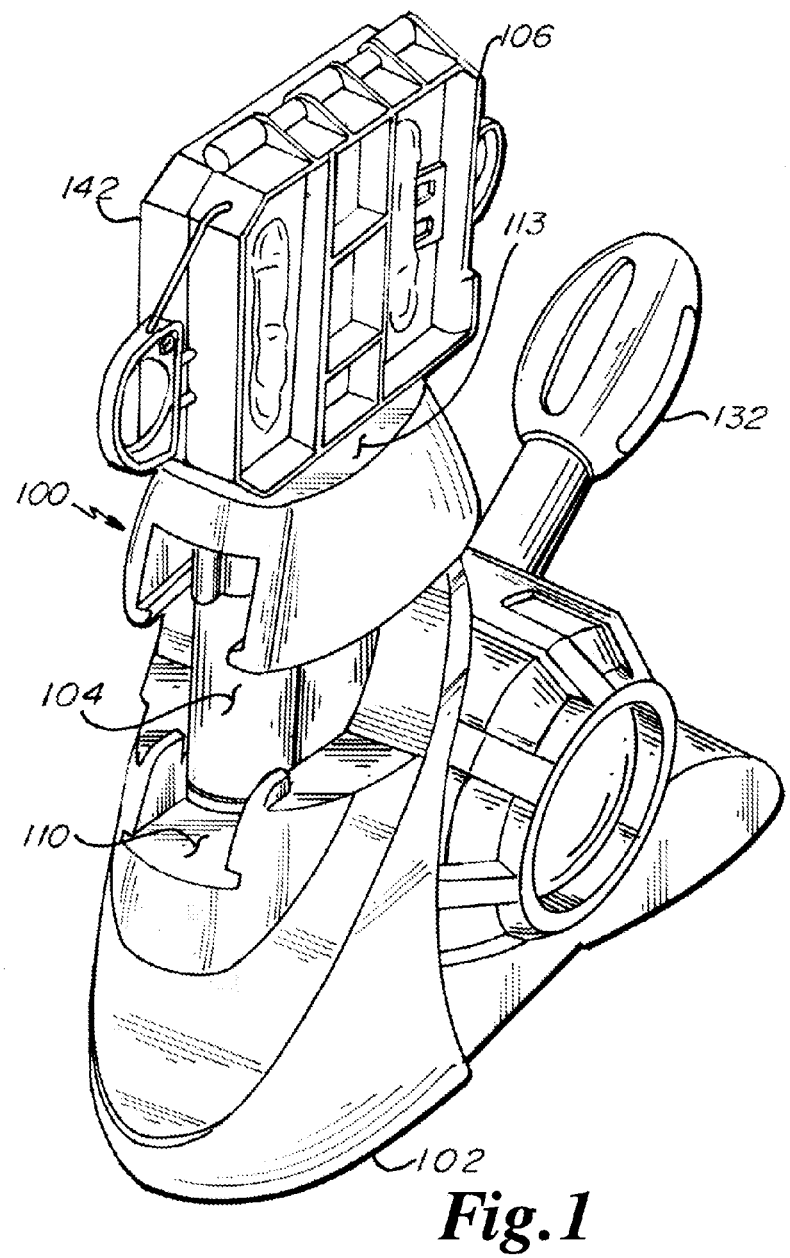
FIG. 1 is a perspective view of a molding system according to a first exemplary embodiment for practicing the invention.

Reference is now made to FIGS. 1 through 10, where there is shown a home-molding system 100 according to just one of the infinite number of possible embodiments of the present invention. System 100 includes main base 102, dispenser cartridge 104, mold 106, and static mixing sprue 108. Main base 102 forms a structure for receiving and supporting the mold and cartridge, and for housing the mechanism for causing injection of materials from the cartridge into the mold.

The main base is preferably constructed of a plurality of thin-walled plastic housing components forming a rigid hollow structure. As seen best in FIG. 1, formed within the main base is a dispenser receiving recess 110 disposed on a frontal surface of the base and shaped and adapted to receive and support the dispensing cartridge 104 in the orientation and condition depicted in FIG. 2. Atop the base is a mold platen 113 in the form of a flat horizontal surface having a specially shaped orifice 112 there-through in communication with the dispenser receiving recess when cartridge 104 has been installed.

Figure 2:
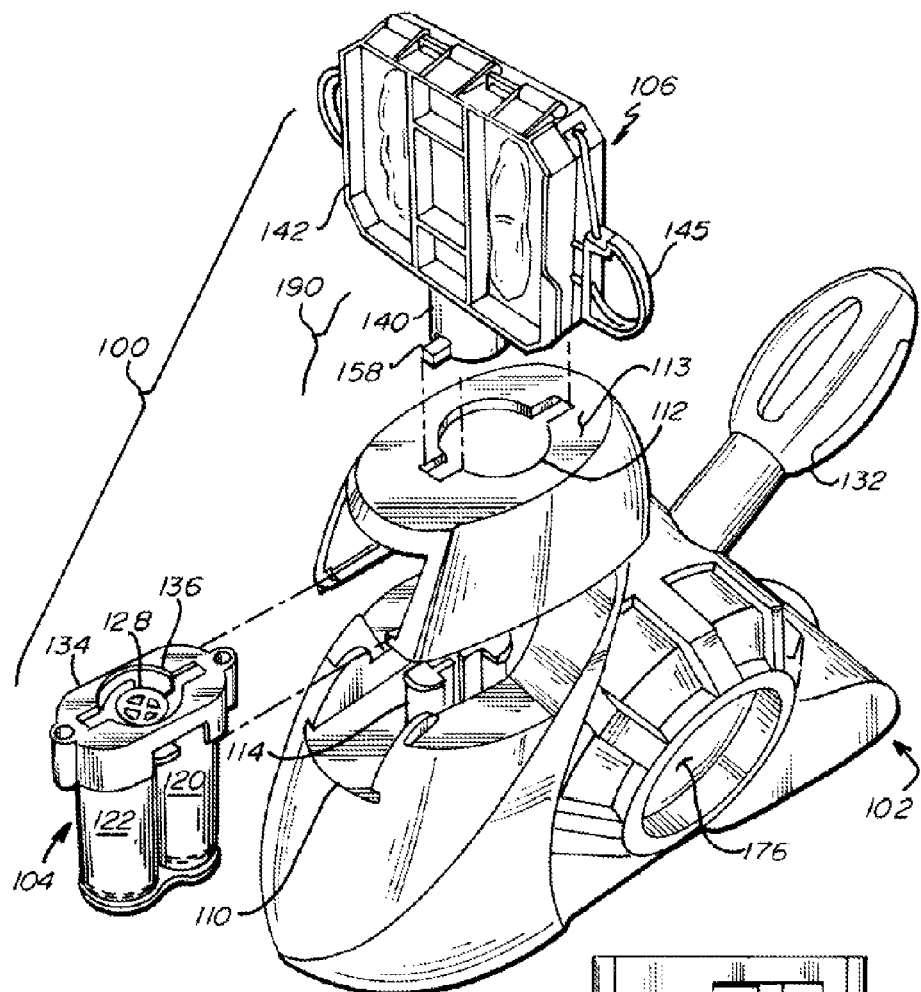
FIG. 2 is an exploded perspective view of the system of FIG. 1.
Figure 3:
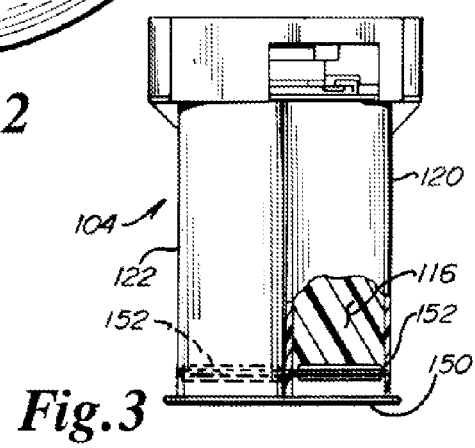
FIG. 3 is a partially-broken side view of the dispenser cartridge of the system of FIG. 1.

Ganged dual plunger 114 is retained by the main base and movable from a retracted position in which is retracted within the hollow interior of the base and an extended position in which it extends into the dispenser receiving recess. In FIG. 2, the plunger is shown extended upwardly for clarity. However, its normal position is retracted down into base 102 below recess 110, and cartridge 104 may only be inserted into recess 110 when plunger 114 is retracted. Pressing plunger release button 176 allows the bias of a spring (not shown) inside base 102 to cause the plunger to its retracted position so that the cartridge may be received by the base.

Figure 10:
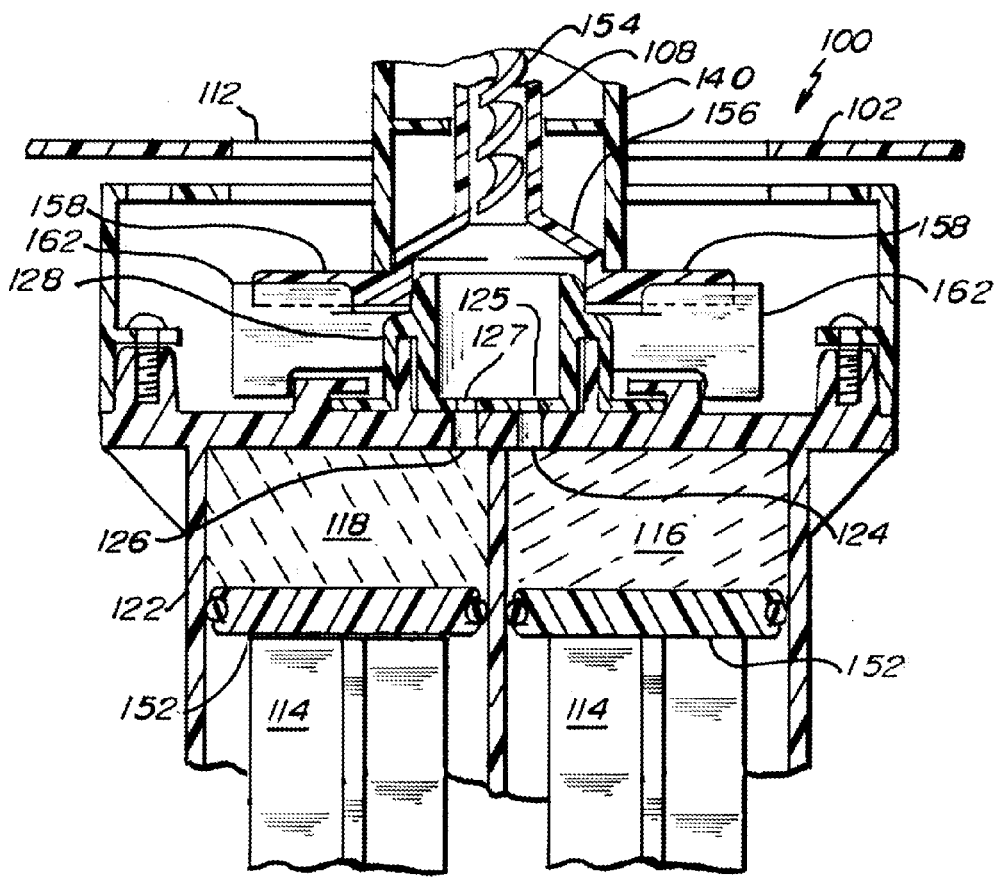
FIG. 10 is a partial cross-sectional view through the dispenser cartridge and mold of FIG. 8B.
Figure 5:
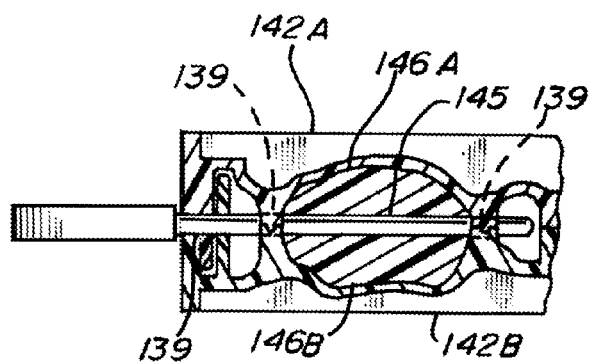
FIG. 5 is a partial cross-sectional side view of the mold of FIG. 4, showing its mold pins in-place after the closing of the mold.
Figure 6:
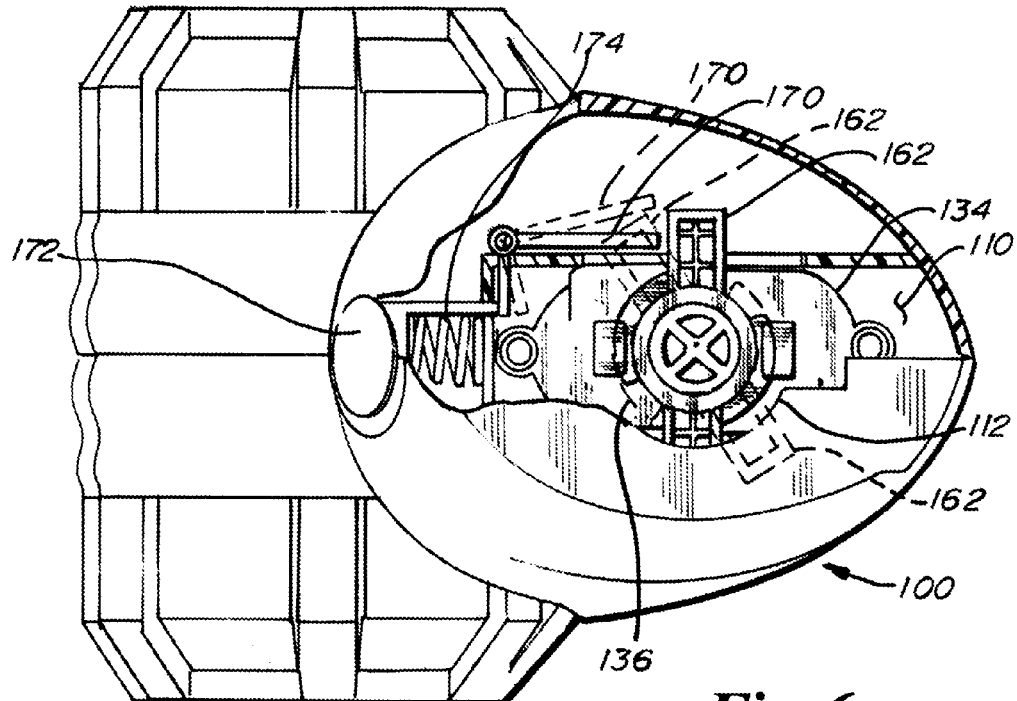

Dispenser cartridge 104 includes two cylindrical chambers for containing the two molding materials separately in their fluid states; material "A" 116 contained in chamber 120 and Material "B" contained in chamber 122. Referring to FIG. 10, chambers 120 and 122 are in fluid communication with nozzles 124 and 126, respectively, which abut valve 128 such that fluids 116 and 118 forced from chambers 120 and 122, respectively, may flow through nozzles 124 and 126, respectively, and through valve holes 125 and 127, respectively, only when valve 128 is in its open state of FIGS. 6, 8B, 9 and 10, as later described, but the fluids are blocked from exiting their associate chambers and through their associated nozzles when the valve is in its closed state of FIGS. 2 and 8A.

Plunger activation lever 132 is disposed partially within base 102 and extends partially from a rear side thereof, and is mechanically connected to plunger 114 by a ratcheting mechanical-advantage mechanism (not shown) such that the rearwardly extending portion of the lever may be grasped and pushed repeatedly downwardly against the bias of the aforementioned internal spring (not shown) to cause the plunger to ratchet upwardly and impinge equally upon chambers 120 and 122 when the cartridge is placed within recess 110. A pawl (not shown) within the base contacts a ratchet rack on the plunger to incrementally hold the plunger up against the spring bias after each upward thrust. If valve 128 is opened as later described, fluids 116 and 118 may be forced upwardly there-from and through the nozzles and valve under a reasonable pressure applied to the chambers by the upward pressure of the plunger against the cartridge's o-ringed disks 152, as later described.

Protective cover 134 of cartridge 104 is secured to chambers 120 and 122 to cover valve 128 such that the valve is only accessible and movable through a second specially shaped orifice 136 in the cover. This prevents a child from tampering by trying to rotate the valve to allow the fluids to escape from the chambers when the cartridge is not properly installed. Specially shaped orifice 136 is shaped and oriented the same as specially shaped orifice 112 atop the base, and the two orifices are aligned when the cartridge is fully and properly inserted into recess 110.

The bottom of the chambers is covered with a protective foil layer 150 that is hermetically bonded to the bottom surface of the cartridge both to seal the chambers for protecting the fluids inside, and to prevent access into the chambers. The foil may be easily punctured by the upwardly extending plunger. Within each chamber is an O-ringed disk 152 that is sealingly slidable within the chamber and isolates the fluid within the chamber from the outside environment. The disks are pushed upwardly by the plunger to force the fluids through the nozzles when the cartridge is properly installed and valve is opened by the mold and mixer, as later described.

Figure 4:
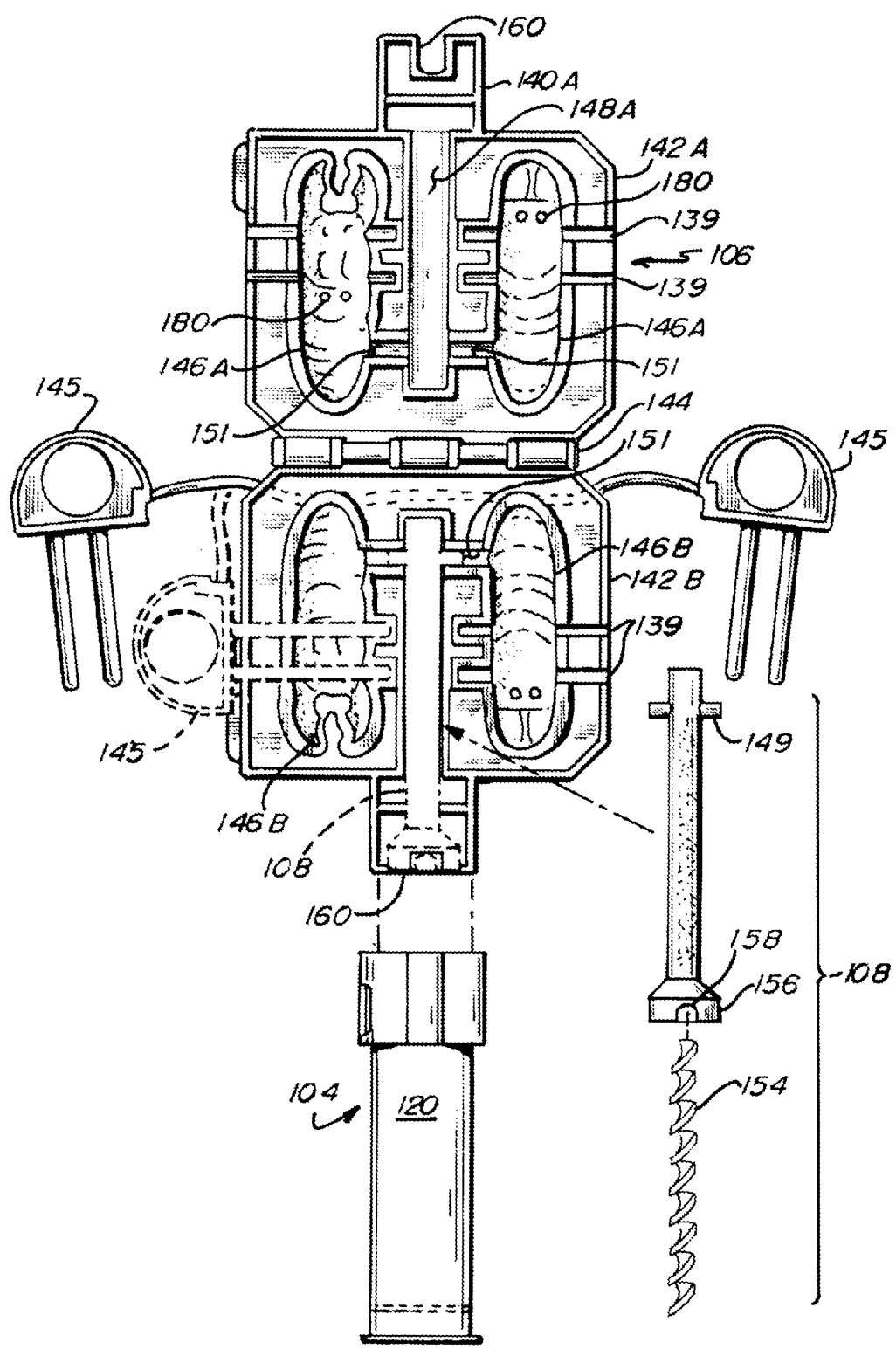
FIG. 4 is a view of the cartridge of FIG. 3 and a mold for use in the system of FIG. 1, having inserted therein a static mixing sprue.

Referring to FIG. 4, mold 106 has two neck halves, 140A and 140B, each integrally molded at a bottom top edge of mold plate 142A and mold plate 142B, respectively. The mold plates are pivotally connected at each plate's top edge by a hinge 144 and may be closed there-about to form mold body 142 and cylindrical neck 140, as seen in FIGS. 1, 2, 8A and 8B, or opened about the hinge to expose cavity portions 146A and 146B and gate portions 148A and 148 B.

Hinge 144 is made of mating hinge pins and hinge loops integrally molded with both mold plates at the top edge thereof. The arrangement of the hinge pins and hinge hoops of each plate are such that the hoops of each hinge align with and removably snap around to the pins of the other hinge. The mold plates are thereby completely separable at the hinge for cleaning or for swapping of different mold plates, as will be explained later. The mold plates may be made of a transparent or translucent material.

Mixer 108 is seen in FIG. 4, and is predominantly cylindrically shaped and fits removably within the gate which is formed inside the mold when gate portions 148A and 148B are brought together with the mold plates. The mixer is preferably made of a transparent or translucent material. The mixer lines the gate and has an opening at its mouth and open-ended tubes 149 extending outwardly from its opposite end. The tubes fit within runner 151 and communicate directly into the mold cavity.

The closing of the mold also traps the mixer therein by closing the runner around tubes 149 and closing the gate around the mixer's body, so that the mixer can only be removed when the mold is reopened. The capturing of tubes 149 by the runner 151 also prevents rotation of the mixer during the later-described molding. The mouth 156 of the mixer is sealingly captured within neck 140 and the two mold plates engage sealingly around the cavity when the mold is closed.

Once the mold is closed about the hinge, mold pins 145 are inserted though channels 139 formed in each mold plate. The cavity has the shape of two full-bodied insect-shaped voids with the interconnecting runner 151 which is also connected to the open-ended tubes 149 of the mixer. The insect shaped voids are preferably just insect abdomens, lacking legs and wings, as will be explained later. The cavity has extremely thin breather channels (not seen) to allow air to escape when fluid is being forced in, but too small to allow fluid to pass through from the cavity during molding. The pins enter the cavity to serve a later-explained function within the cavities.

Mixer 108 includes a hollow chamber with a static mixing helix 154 removably placed therein. The mouth 156 of the mixer is disposed within and sealingly captured by the neck and has male extension tabs 158 which project radially outwardly there-from and through slots 160 in the neck so that together, the neck and male tabs cooperate to form fitting 190 having a cross-sectional shape that corresponds to the specially shaped holes, that can fit there-through to allow the mixer's mouth 156 to engage valve 128.

The neck, mixer mouth, and male tabs pass through specially shaped orifices 112 and 136 to engage the valve, with the mouth sealingly connecting to the valve and the tabs 158 engaging inner recesses 164 in extension tabs 162 of the valve. The neck portions 140A and 140B may be trapped together by at least orifice 112 to retain the mold plates 142A and 142B tightly abutted.

A ninety angular degree clockwise (from top view) rotation of the mold 106 causes an equal rotation of the mixer tabs and thereby causes an equal rotation of valve 128 relative to the cartridge 104 and base 102. This ninety angular degree rotation of the valve accomplishes several functions simultaneously;

it aligns two holes 125 and 127 that pass through the valve with nozzles 124 and 126, respectively, which were previously blocked and thereby "opens" the valve to allow the escape of fluid from the cartridge chambers;

it causes the valve tabs 162 to fit within mating recesses (not seen) within the cartridge recess 110 of the base, and thereby locks the cartridge into the base to temporarily prevent its removal;

it causes the valve tabs to engage locking pawl 170, which rotationally locks the mold and valve to prevent removal without a later-explained by-pass procedure; and it causes the mixer tabs 158 to rotate under the base's upper surface to thereby lock the mold to the base and cartridge. This is a multiple safety feature that not only keeps the assembly together during the molding process, but also prevents access to the fluid materials 116 and 118 as they escape chambers 120 and 122, respectively.

Once neck 140 and mixer 108 have engaged and rotated valve 128, lever 132 may be repeatedly pushed downwardly and released to ratchet plunger 114 up through foil where it engages the o-ringed disks 152. When the molding system is assembled and the plunger lever is pressed, fluids 116 and 118 are forced from the chambers of the cartridge and through nozzles 124 and 126 and valve holes 125 and 127 and into the mixer where they are mixed together by the turbulence caused by static mixing helix 154 and forced as a homogeneous mixture out of the open ends of tubes 149, through runner 151 to the insect-shaped voids. Air previously occupying the voids escapes through the breather channels so that the fluid can fill the voids without entrapping air to cause bubbles and imperfections. The pressure exerted upon the lever is multiplied by mechanical advantage so that a significant positive pressure is exerted on the mixture and causes it to completely fill even the finest details in the voids. Even fine hair-like features and paper-thin membranes may be molded.

The transparency of the mold plates and mixer and the disposition of the mold above and outside of the base during molding provide an entertaining feature in that the user may watch the mixed material as it flows into the cavity. This also provides a functional benefit in that the user can see when the cavities are filled and stop activating the lever accordingly.

Fluids 116 and 118 are mutually reactive and when homogeneously mixed begin a curing process that causes the mixture to gel into a rubbery solid within approximately three minutes. Having completely filled every contour of the insect-shaped voids, the mixture forms rubber insects (or any other shaped figure as may be desired) that can then be removed from the molds after reversal of the system assembly procedure. It is a feature of the system that the disassembly is arranged to require approximate two minutes so that the insects will be well-gelled and almost fully cured by the time they are accessible. This prevents access to the liquid uncured mixture by children, which, even though non-toxic, is sticky and messy.

As previously mentioned, locking pawl 170 had captured one of tabs 162 during the ninety angular degree rotation of the mold upon assembly. In order to rotate the mold back so that the tabs are re-aligned with orifices 112 and 136 and the mold is removable from the system, pawl release button 172 must be depressed during the counter-clockwise rotation of the mold. The pawl is biased by spring 174 to return to its original position upon release of the button, ready to capture the next mold during the next assembly cycle.

In order to lower the plunger 114 and extract it from the cartridge, plunger release button 176 is pressed. The button is mechanically connected to the pawl inside base 102 that engages the plunger's ratchet rack (not seen), and the plunger is biased back to its retracted state by the internal spring (not shown). When the plunger release button is depressed, it temporarily pulls the pawl from the rack and allows the plunger to drop to its retracted state so that the cartridge may now be pulled from cartridge recess 110, after the mold has been rotated to remove tabs 162 from the mating recesses within recess 110 and the mold has been removed.

Figure 7A:
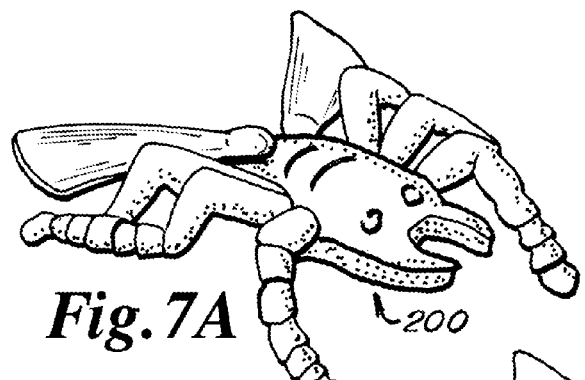
FIG. 7A is an exploded perspective view of a figure molded in the system of FIG. 1 and its appendages.
Figure 7B:
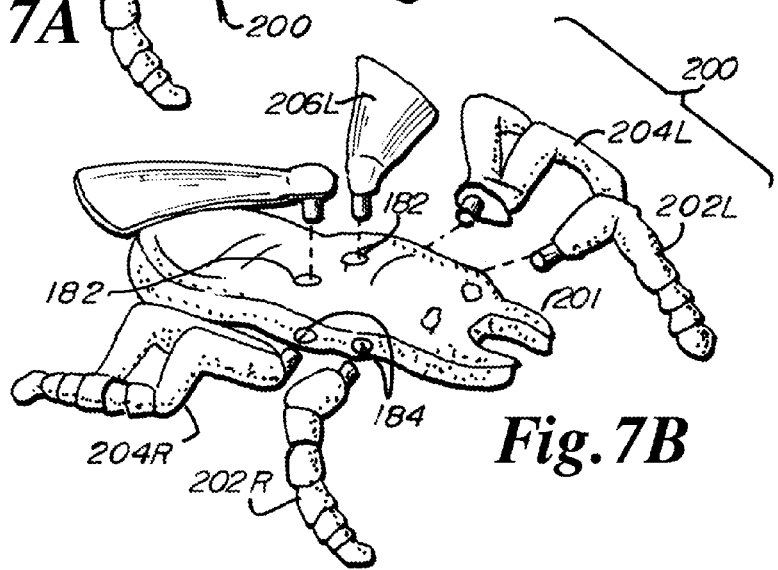
FIG. 7B is a perspective view if the figure if FIG. 7B with its appendages assembled thereto.
Figures 8A, 8B, 9:
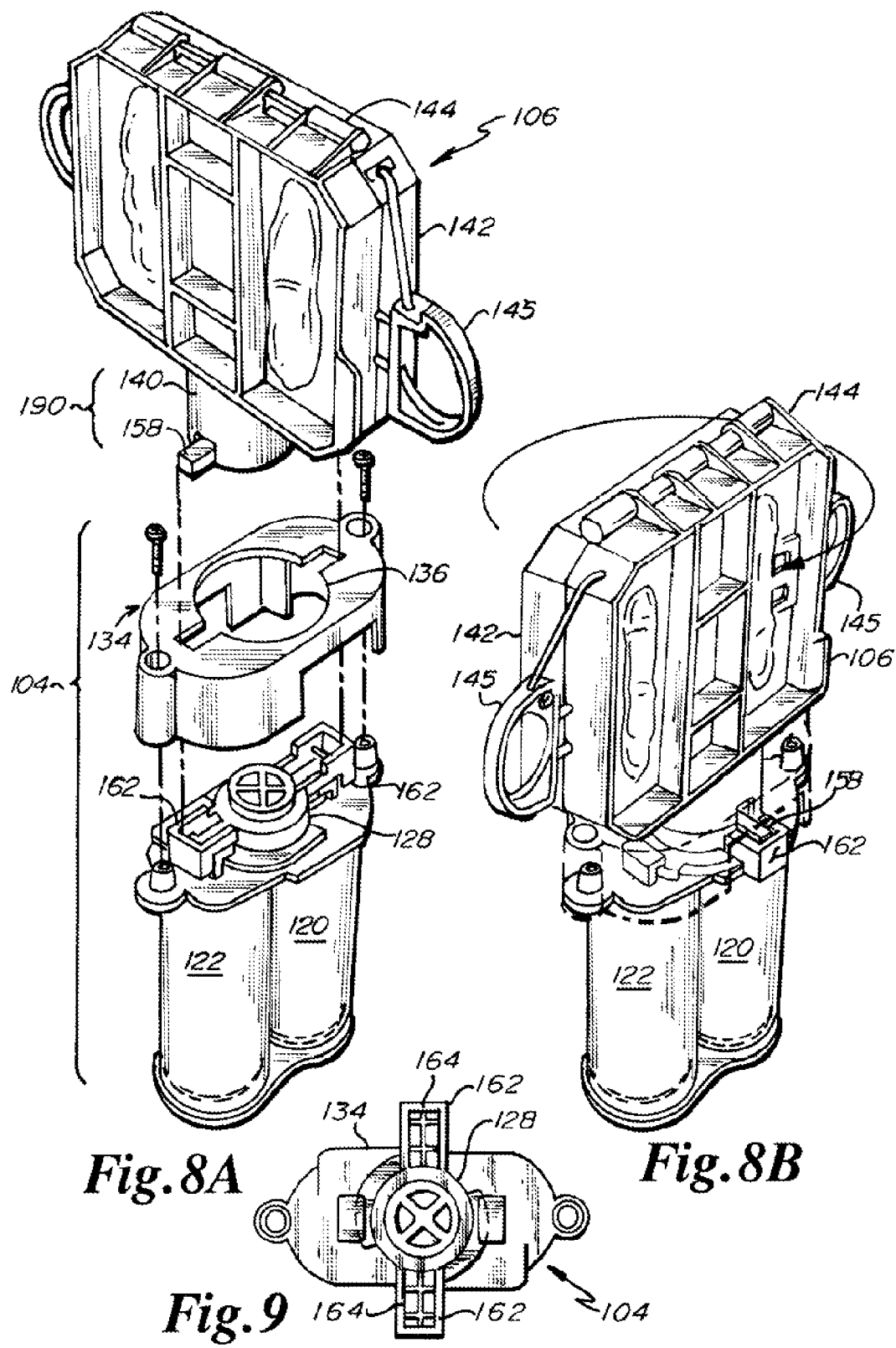
FIG. 8A is an exploded partial perspective view of the system of FIG. 1, including only the dispenser cartridge, mold, and mixer.
FIG. 8B is a partial perspective view showing the of the interlocking of the mold of FIG. 8A to the cartridge.
FIG. 9 is a top view of the dispenser cartridge of FIG. 8B with its valve rotated to the open position.

Removal of pins 145 from the mold allows re-opening of the mold plates, and removal of the mixer and formed insect abdomens 201, as seen in FIG. 7A. The pins have created orifices 184 in the abdomens in the locations where the pins had passed through the mold walls and into the cavities. Other orifices 182 were formed in the abdomens by posts 180 of the cavities. The orifices are positioned where the insect's appendages, such as legs 202L, 202R, 204L and 204R, and wings 206L and 206R, would be attached to the abdomens 201, and a supply of such appendages having integral posts for insertion into the orifices is supplied with the system. Otherwise, the wings and legs may be molded by a similar procedure as above-described. The wings and legs may be made of a material that is harder and/or of a different color, and may be permanently bondable to the abdomens. Insertion and/or bonding of the appendages completes assembly of the insects 200, as shown in FIG. 7B, which are now ready for play.

Removal of the mixer 108 from mold 106 and removal of the mixing screw 154 from the mixer allows for easy removal and disposal of any excess material which has cured therein. The mold, mixer, and screw are preferably made of a polyethylene or polypropylene material from which the cured mixture is easily peeled to leave the molding system pristine and ready for the next molding cycle.

Numerous other mold plate pairs are provided with the system for producing other insects. And as previously mentioned, the mold plates are swap-able with other mold plates to allow further variation of the insects producible with the system. For instance, mold plate 142B may produce only the bottom of the abdomens of two insects and mold plate 142A may produce the tops. But another top mold plate may be made available which produces different abdomen tops and is equally affixable to mold plate 142A. This allows the same bottom mold plate to be used with numerous top mold plates and vice-versa, and allows for a large assortment of insects to be produced from only a few mold plate pairs.

The following chart is a generalized formulation of a opaque RTV silicone material, a compound of components A and B in a 1:1 volume ratio;

| Part A | |
|---|---|
| 50-70% | Polysiloxane (di-Me), vinyl terminated - CAS #: 68083-19-2 |
| 5-15% | Polydimethylsiloxane - CAS #: 63148-62-9 |
| 5-15% | Quartz - CAS #: 14808-60-7 |
| <0.1% | Platinum catalyst - CAS #: 2627-95-4 |
| <0.1% | Platinum catalyst - CAS #: 68478-92-2 |
| 10-15% | HMN and VMN treated silica - CAS #: 68988-89-6 |
| Part B | |
| 50-70% | Polysiloxane (di-Me), vinyl terminated - CAS # 68083-19-2 |
| 5-15% | Polydimethylsiloxane - CAS #: 63148-62-9 |
| 5-15% | Quartz - CAS #: 14808-60-7 |
| 5-10% | Polysiloxane (di-Me, Me H) - CAS #: 68037-59-2 |
| 10-15% | HMN and VMN treated silica - CAS #: 68988-89-6 |

The following chart is a generalized formulation of a transparent RTV silicone material, a compound of components A and B in a 1:1 volume ratio;

| Part A | |
|---|---|
| 50-80% | Polysiloxane (di-Me), vinyl terminated - CAS #: 68083-19-2 |
| 10-20% | Treated resin base - CAS #: 104199-38-4 |
| <0.1% | Platinum catalyst - CAS #: 2627-95-4 |
| <0.1% | Platinum catalyst - CAS #: 68478-92-2 |
| Part B | |
| 50-80% | Polysiloxane (di-Me), vinyl terminated - CAS # 68083-19-2 |
| 10-20% | Treated resin base - CAS # 104199-38-4 |
| 5-10% | Polysiloxane (di-Me, Me H) - CAS #: 68037-59-2 |
| 0-5% | Phenyltris(dimethylsiloxy)silane - CAS #: 18027-45-7 |

As mentioned, the system is packaged with a pre-molded plurality of the various appendages and/or those appendages may be separately home-molded using different colored and/or harder material in separate molds. The appendages may also be insert-molded into the abdomens. For instance, wings and legs 202L, 202R, 204L, 204R, 206L, and 206R may all be attached as a wing/leg structure by an integrated web, and the mold cavities may have voids identically shaped to accept this structure, and the abdomens may be permanently molded to the structure be molding over and around the web.

The invention may include alternative means to prevent the replaceable cartridge from releasing its materials except while properly installed into the system with the mold properly seated in-place. For example; above each of the two O-ringed disks may be added a hard plastic plate having there-though a keyed cutout (such as a female cruciform hole). The keyed hard plastic plate is glued, sonic sealed or otherwise permanently attached to the top of each cylindrical syringe opening. Each piston of the plunger would then be shaped as a mate to the keyed cutout of the associated cylinder of the syringe (such as two male cruciform rods sized and shaped to pass through the female cruciform holes) and engage the O-ringed disks, thus denying the ability of a child to easily access the O-ringed disk and force materials from the syringe when the syringe is not within the molder base. Then only when the syringe cartridge is properly placed with the molder base's receiving chamber may the lever be activated to force the material from the syringe.

The lever and mechanical-advantage mechanism for actuating the plunger may also take any other functional form, such as a manual or electric screw-drive or hydraulic mechanism.

As an additional safety feature, the platen of the mold base on which the mold mounts, may also have keyed female openings of unusual shapes which mate with corresponding male shapes on the mold bases themselves. These male shapes would press a mechanism inside the mold base and/or syringe which removes a physical block that otherwise denies the lever the plunger activating mechanism from being activated.

As previously mentioned, the system is capable of producing full-bodied figures of approximately thirty durometer Shore "00" scale or less, When such figures have shapes capable of rolling to some degree, they are found capable of afore-described "wall-walking" by falling slowly down along while rolling against a vertical surface. Bas-relief figures are incapable of such a feature regardless of durometer, because one side of a bas-relief figure is flat and such shapes are not capable of rolling.

While the invention has been shown and described with reference to a specific exemplary embodiment, it should be understood by those skilled in the art that various changes in form and detail may be made without departing from the spirit and scope of the invention, and that the invention should therefore only be limited according to the following claims, including all equivalent interpretation to which they are entitled.

I claim:

1. A system for home-molding comprising:
    a structure having:
        a dispenser receiver;
        a movable plunger; and
        a plunger actuator;
    a dispenser adapted for temporary affixation to said structure at said dispenser receiver and having:
        a mold receiver;
        a reservoir containing a fluid adapted to remain in a liquid state while therein;
        a dispenser-structure interface for temporary affixation to said dispenser receiver; and
        a nozzle for allowing said fluid to exit said reservoir; and
    a mold having:
        a mold-dispenser interface adapted for temporary affixation to said dispenser at said mold receiver;
        one of a gate and a sprue adapted for fluid communication with said nozzle when said mold is affixed to said dispenser at said mold-dispenser interface;
        first and second abuttable mold plates; and
        a cavity formed between said mold plates and in fluid communication with said one of a gate and a sprue;
    wherein said plunger actuator is adapted to cause said plunger to move relative to said dispenser receiver and impinge on said dispenser, only when said dispenser is affixed to said structure at said dispenser-structure interface, and force said fluid there-from through said nozzle and, only when said mold is affixed to said dispenser at said mold-dispenser interface, though said one of a gate and a sprue and into said cavity; and
    means for causing said fluid to congeal in said mold cavity.

2. The system of claim 1 further comprising an interlock for preventing said fluid from exiting said nozzle except when said one of a gate and a sprue is in fluid communication with said nozzle.

3. The system of claim 2 wherein said dispenser comprises first and second reservoirs, and said fluid comprises a first fluid contained within said first reservoir and a second fluid contained in said second reservoir, and wherein said means for causing said fluid to congeal is mixing said first and second fluids.

4. The system of claim 3 further comprising a mixer fluidly disposed between said reservoirs and said cavity for mixing said first and second fluids prior to said fluids being forced into said cavity.

5. The system of claim 4 wherein said mixer is removably disposed within said one of a gate and a sprue.

6. The system of claim 5 wherein said cavity comprises first and second cavity portions, said first cavity portion disposed in said first mold plate and said second cavity portion disposed in said second mold plate; and
    wherein said first and second cavity portions are united when said first and second mold plates are abutted to form said cavity.

7. The system of claim 6 wherein said mold is disposed externally of said structure when affixed to said dispenser at said mold-dispenser interface.

8. The system of claim 2 wherein said interlock comprises:
    a valve comprised by said nozzle and movable between a first position wherein said valve denies the exit of said fluid from said nozzle and a second position wherein said valve allows the exit of fluid from said nozzle; and
    a valve actuator comprised by said mold-dispenser interface and adapted to move said valve between said first and second positions.

9. The system of claim 8 wherein said valve further comprises a key and said structure further comprises a key receiver;
    wherein said key is received by said key receiver only when said dispenser is affixed to said dispenser receiver and said valve is in said second position, and movement of said valve from said second position to said first position removes said key from said key receiver; and
    wherein receipt of said key by said key receiver denies removal of said dispenser from said dispenser receiver.

10. The system of claim 1 wherein said mold receiver is adapted to retain said first and second mold plates abutted when said mold is affixed to said dispenser at said mold-dispenser interface.

11. The system of claim 1 further comprising one or more removable mold pins at least partially disposed within said cavity, said one or more pins adapted to cause orifices in the congealed fluid within said cavity when said one or more pins are removed there-from.

12. A system for home-molding elastomeric toy figures comprising:
   a base having:
      a dispenser receiving chamber;
      a movable plunger; and
      a plunger lever;
   a dispenser adapted for insertion into said dispenser receiving chamber and having:
      a mold receiving orifice;
      a first reservoir containing a first fluid;
      a second reservoir containing a second fluid; and
      a nozzle comprising one or more outlets for allowing said fluids to exit said reservoirs;
   a mold having:
      a fitting adapted for temporary affixation to said dispenser at said mold receiving orifice;
      one of a gate and a sprue adapted for fluid communication with said nozzle when said mold is affixed to said dispenser at said fitting;
      first and second abuttable mold plates; and
      a cavity formed between said mold plates and in fluid communication with said one of a gate and a sprue; and
   a mixer removably disposed within and communicating with said one of a gate and a sprue for mixing said first and second fluids having exited said reservoirs;
   wherein said plunger lever is adapted to cause said plunger to move relative to said dispenser receiving chamber and impinge on said first and second reservoirs, only when said dispenser is inserted into said dispenser receiving chamber, and force said fluids there-from through said nozzle and, only when said mold is affixed to said dispenser at said fitting, though said one of a gate and a sprue, through said mixer, and into said cavity; and
   wherein said first and second fluids are co-reactive and thereby adapted to homogeneously congeal after mixing and within said cavity, to form an elastomeric toy figure having a shape substantially identical to said cavity.

13. The system of claim 12 further comprising an interlock for preventing said fluid from exiting said nozzle except when said one of a gate and a sprue is in fluid communication with said nozzle, said interlock comprising:
   a valve comprised by said nozzle and movable between a first position wherein said valve denies the exit of said fluid from said nozzle and a second position wherein said valve allows the exit of fluid from said nozzle; and
   a valve actuator comprised by said fitting and adapted to move said valve between said first and second positions.

14. The system of claim 13 wherein said valve further comprises a pawl and said base further comprises a pawl receiver;
   wherein said pawl is received by said pawl receiver only when said valve is in said second position, and movement of said valve from said second position to said first position removes said pawl from said pawl receiver; and
   wherein receipt of said pawl by said pawl receiver denies removal of said dispenser from said base.

15. The system of claim 14 wherein said cavity comprises first and second cavity portions, said first cavity portion disposed in said first mold plate and said second cavity portion disposed in said second mold plate; and
   wherein said first and second cavity portions are united when said first and second mold plates are abutted to form said cavity.

16. The system of claim 15 wherein said mold is disposed externally of said base when affixed to said dispenser at said fitting.

17. The system of claim 12 wherein said mold receiving orifice is adapted to retain said first and second mold plates abutted when said mold is affixed to said dispenser at said fitting.

18. The system of claim 12 further comprising one or more removable mold pins at least partially disposable within said cavity, said one or more pins adapted to cause orifices in the homogeneously congealed fluid within said cavity when said one or more pins are removed there-from.

19. A method for home-molding elastomeric toy figures in a system, said system comprising:
   a base having:
      a dispenser receiving chamber;
      a movable plunger; and
      a plunger lever;
   a dispenser adapted for insertion into said dispenser receiving chamber and having:
      a mold receiving orifice;
      a first reservoir containing a first fluid;
      a second reservoir containing a second fluid; and
      a nozzle comprising one or more outlets for allowing said fluids to exit said reservoirs;
   a mold having:
      a fitting adapted for temporary affixation to said dispenser at said mold receiving orifice;
      one of a gate and a sprue adapted for fluid communication with said nozzle when said mold is affixed to said dispenser at said fitting;
      first and second abuttable mold plates; and
      a cavity formed between said mold plates and in fluid communication with said one of a gate and a sprue; and
   a mixer removably disposed within and communicating with said one of a gate and a sprue for mixing said first and second fluids having exited said reservoirs;
   wherein said plunger lever is adapted to cause said plunger to move relative to said dispenser receiving chamber and impinge on said first and second reservoirs, only when said dispenser is inserted into said dispenser receiving chamber, and force said fluids there-from through said nozzle and, only when said mold is affixed to said dispenser at said fitting, though said one of a gate and a sprue, through said mixer, and into said cavity; and
   wherein said first and second fluids are co-reactive and thereby adapted to homogeneously congeal after mixing and within said cavity, to form an elastomeric toy figure having a shape substantially identical to said cavity;
   said method comprising:
   inserting said dispenser into said dispenser receiving chamber;
   disposing said mixer within with said one of a gate and a sprue;
   abutting said first and second mold plates;
   affixing said fitting to said mold receiving orifice;
   causing said lever to move said plunger to impinge on said reservoirs and force said fluids there-from through said nozzle, gate, and mixer, and into said cavity;
   removing said fitting from said mold receiving orifice;
   separating said first and second plates; and
   removing the elastomeric toy figure from said cavity.

20. The method of claim 19 wherein said system further comprises one or more removable pins at least partially disposable within said cavity, said one or more pins adapted to cause orifices in the homogeneously congealed fluid within said cavity when said one or more pins are removed therefrom; and said method further comprises;

disposing said one or more mold pins within said cavity prior to said causing said lever;

removing said one or more mold pins from the elastomeric toy figure to cause said orifices therein;

providing appendages; and inserting said appendages into said orifices after said removing the elastomeric toy figure.

* * * * *